United States Patent
Schaper et al.

[11] Patent Number: 6,047,564
[45] Date of Patent: Apr. 11, 2000

[54] METHOD OF PRODUCING QUARTZ GLASS BODIES

[75] Inventors: Hartwig Schaper, Aschaffenburg; Klaus Ruppert, Maintal, both of Germany

[73] Assignee: Heraeus Quarzglas GmbH, Hanau, Germany

[21] Appl. No.: 09/029,684

[22] PCT Filed: Jul. 17, 1997

[86] PCT No.: PCT/EP97/03818

§ 371 Date: Mar. 3, 1998

§ 102(e) Date: Mar. 3, 1998

[87] PCT Pub. No.: WO98/03440

PCT Pub. Date: Jan. 29, 1998

[30] Foreign Application Priority Data

Jul. 18, 1996 [DE] Germany .................. 196 28 958

[51] Int. Cl.[7] ................................................. C03B 20/00
[52] U.S. Cl. .................. 65/17.4; 65/29.11; 65/29.19; 65/384; 65/414
[58] Field of Search ..................... 65/17.4, 29.1, 65/29.11, 29.19, 384, 414

[56] References Cited

U.S. PATENT DOCUMENTS

| | | | |
|---|---|---|---|
| 2,491,606 | 12/1949 | Dickey et al. | 236/46 |
| 3,806,570 | 4/1974 | Flamenbaum et al. | 264/1.21 |
| 4,199,335 | 4/1980 | Gliemeroth et al. | 65/419 |
| 4,235,616 | 11/1980 | Siegfried | 65/418 |
| 4,292,341 | 9/1981 | Marcuse et al. | 427/10 |
| 4,331,462 | 5/1982 | Fleming, Jr. et al. | 65/391 |
| 4,731,103 | 3/1988 | Mizutani et al. | 65/312 |

FOREIGN PATENT DOCUMENTS

| | | |
|---|---|---|
| 0067050 | 12/1982 | European Pat. Off. |
| 0476218 | 3/1992 | European Pat. Off. |
| 649821 | 1/1989 | Japan |
| 2172838 | 7/1990 | Japan |
| 2204340 | 8/1990 | Japan |
| 2212327 | 8/1990 | Japan |
| 3228845 | 10/1991 | Japan |
| 3279234 | 12/1991 | Japan |
| 4-310531 | 11/1992 | Japan |

*Primary Examiner*—Sean Vincent
*Attorney, Agent, or Firm*—Whitman Breed Abbott & Morgan LLP; Andrew L. Tiajoloff

[57] ABSTRACT

In a known process for the production of quartz glass bodies, $SiO_2$ particles are deposited of the mantle surface of a cylindrical carrier rotating about its longitudinal axis, forming an elongated, porous preform, where the $SiO_2$ particles are formed in a plurality of flame hydrolysis burners which are arranged in at least one burner row parallel to the longitudinal axis of the carrier and are moved at a preset translational speed forward and back between turnaround points at which points their direction of movement is reversed, and in which process the preform is sintered. In order to make available on this basis an easily accomplished process that makes it possible to manufacture a preform which is largely free of localized density variations, the invention proposes on the one hand that the base value of the surface temperature of the preform being formed be kept in a range between 1,050° C. and 1,350° C., that the average peripheral velocity of the preform be kept in the range between 8 m/min and 15 m/min and the average translational velocity of the burner row be kept in a range between 300 mm/min and 800 mm/min. On the other hand, the object is also accomplished according to the invention and on the basis of the known process in that in the area of the turnaround points (A, B) the peripheral velocity of the preform being formed is increased and/or the flame temperature is lowered and/or the distance of the burners from the preform surface is changed.

13 Claims, 4 Drawing Sheets

METHOD OF PRODUCING QUARTZ GLASS BODIES

FIELD OF THE INVENTION

The invention relates to a process for the production of quartz glass bodies by deposition of $SiO_2$ particles on the mantle surface of a cylindrical carrier rotating about its longitudinal axis and forming an elongated porous preform, where the $SiO_2$ particles are formed in a plurality of hydrolysis burners which are arranged in at least one burner row disposed parallel to the longitudinal axis of the carrier and between turnaround points at which points the direction of burner movement is reversed, where the burners move at a preset translational speed forward and back, and by the sintering of the preform.

DISCUSSION OF PRIOR ART

Such a process is described in EP A1 0 476 218. In the known process, $SiO_2$ particles are deposited in layers by flame hydrolysis burners on a horizontally oriented substrate rod which rotates about its longitudinal axis. The burners are installed equidistantly 10 cm apart on a burner block extending parallel to the longitudinal axis of the substrate rod. The burner block is moved back and forth along the porous cylindrical preform which is being formed during the $SiO_2$ particle deposition, and between a left and a right turnaround point. The amplitude of the translational motion is lesser than the length of the preform. Due to the slowing down of the translational motion of the burner block at the points of directional reversal an overheating of the preform surface takes place and with it a localized axial density variation develops. This creates areas of differing reactivity of the preform which make themselves known especially during subsequent chemical reactions in further treatment of the preform and which can result in non-homogeneousness of the quartz glass body after the sintering of the preform.

EP A1 0 476 218 proposes to solve this problem by continuously relocating the turnaround points of the burner block motion in relation to the preform and thus distributing them evenly over the preform. For this purpose both the left and the right turnaround points are relocated by a few millimeters at every burner pass.

However, this merely results in an even distribution in the preform of the localized density variations which develop at the turnaround points. In addition, the complicated translational motion of the burner blocks in this known process requires a high expense related to the apparatus and the controls.

SUMMARY OF THE INVENTION

Therefore the object of the present invention is to make available an easily implemented process which would make possible the production of a preform largely free of localized axial density fluctuations.

Based on the process described above, the object is accomplished according to the invention in that the base value of the surface temperature of the preform being formed is kept in a range between 1,050° C. and 1,350° C., that the average peripheral velocity of the preform is kept in the range between 8 m/min and 15 m/min and that the average translational velocity of the burner row is kept in a range between 300 mm/min and 800 mm/min.

The surface temperature of the preform is measured at the point of flame impingement of one of the central hydrolysis burners in the burner row. A "Infratherm IN 4/5" pyrometer made by IMPAC and having a measurement wavelength of 5.14 $\mu$m is used for this purpose. The measurement area is approximately 5 mm at a distance of the pyrometer from the preform surface of 30 cm at a temperature between 500° C. and 1,300° C. The burner flame impingement point has a somewhat greater diameter of about 15 m. When the pyrometer is properly adjusted the measurement point is within the flame impingement area. A mis-adjustment results in a measured value that is lower than the actual temperature. The measured temperature resulting from correct adjustment will be used as the surface temperature hereinafter.

This temperature value substantially determines the density of the porous preform. A deposition of $SiO_2$ particles at the indicated temperature range normally results in average relative densities of the preform between 15% and 35% in relation to the density of quartz glass (2.2 $g/cm^3$). Ten equidistant test drill cores with a diameter of 3 cm, arranged along the length of the preform are taken to establish the average relative density of the preform as exactly as possible. The cores are measured by means of a mercury pycnometer. The average relative density of the preform is then derived from the arithmetic average value of these measurements, in relation to the above indicated theoretical density of quartz glass.

The base value of the surface temperature is substantially determined by the flame temperature of the hydrolysis burners, their quantity and distance from the preform surface, as well as their size.

That value can be easily set by an expert in a range between 1,050° C. ad 1350° C. Several rows of burners can also be used for the formation of the porous preform. The points of burner flame impingement of the various rows can extend along a common line on the preform surface. The burners of different rows can be arranged at one height, or offset, as seen in vertical direction relative to the cylinder axis of the carrier. In the case of multiple rows it is sufficient to determine the surface temperature base value in one of the rows.

It has been shown that at a base surface temperature value between 1,050 and 1350° C., a relatively low increase of the surface temperature of max. 150° C. in relation to the base value is attained at the turnaround points when the above indicated velocity range of the preform rotation or the average translational velocity of the burner row is maintained. A temperature increase of about 150° C. corresponds to a maximal increase of the relative density of about 6%. Such axial density gradient in the preform does not reduce the usefulness for many applications of quartz glass bodies subsequently produced from the preform after the sintering. Naturally, the smaller the temperature difference is kept between the base value and the maximal value at the turnaround points, the lower the increase of the relative density.

It has been shown to be significant that the motion of the burners relative to the preform is on average relatively small (when viewed over the entire motion cycle). Based on this realization and the average translational velocity ranges of the preform rotational speed and the average translational speed of the burner row, an expert can optimize these steps by means of a few experiments to such an extent that the temperature increase does not exceed 150° C. over the base value of the surface temperature. Due to the fact that one or both of the velocities in question are set based on a relatively small average value during the forward and back motion (hereinafter "motion cycle"), the preform surface in the vicinity of the flame impingement point is well heated through. The difference between the well warmed-through surface and the higher temperature in the turnaround region is therefore relatively small. The relative temperature increase in the turnaround region (as compared to the well warmed-through surface of the preform) is therefore the smaller the lower the velocity of the relative motion between the preform surface and the burner row in the middle.

The average translational velocity of the burner row is defined as the ratio of the distance covered during one motion cycle and the time required for it.

The average peripheral velocity of the preform being produced is derived from the distance covered by every point on the surface of the preform during the motion cycle relative to the time required to cover that distance.

Typically the average translational velocity is kept constant during the entire deposition process. It should be noted that at the turnaround points the translational velocity equals zero and in practice the slowing down of the burner row requires a stopping distance and the acceleration requires an acceleration distance during which the average translational velocity necessarily cannot be in effect.

The average peripheral velocity can also be held constant during the entire deposition process. In this case the rotation velocity of the carrier must be continually decreased since the outer diameter of the preform and with it the cylinder mantle surface continually increase during the deposition process.

Both the translational velocity and the peripheral velocity can be varied during the motion cycle, for example the peripheral velocity in the area of the turnaround points can be increased.

In kinematic reversal, instead of the burner row, or of course in addition to it, the preform can also be moved back and forth, where then instead of the translational velocity of the burner row it is the translational velocity of the preform or the relative speed between the burner row and the preform surface that needs to be observed.

It has been shown to be disadvantageous when the preform area between adjoining turnaround points can cool to too low a temperature during a motion cycle. Such disadvantageous cooling is prevented by the above indicated minimum velocities of the outer preform and/or the average burner row translational velocity.

Axial density gradients in the preform are largely avoided by the process according to the invention. Therefore the issue is beyond a merely even distribution of density gradients in the preform as described in prior art. A relocation of the turnaround points is not necessary for this so that equipment and control device expenditures can be kept low. However, a relocation of the turnaround points is possible as a supplementary technique.

It has been shown to be advantageous to maintain the distance of adjoining turnaround points between 5 cm and 40 cm. This helps to prevent an excessive cooling of the preform surface between adjoining turnaround points during a motion cycle.

It has also been shown to be advantageous in this regard to use a warming burner between every two adjoining burners in a burner row. The warming burners are moved according to the motion of burner row and shorten the distance between heated areas on the preform. They can be arranged centrally between the hydrolysis burners. For this purpose the warming burners can be arranged on the same burner row or on a separate warming burner block being moved synchronously to the burner row which moves along the carrier.

Further, the above-mentioned object on the basis of the process of the kind described is attained according to the invention in that in the turnaround point zone the peripheral velocity of the developing preform is increased and/or the flame temperature of the hydrolysis burners is lowered and/or the distance of the hydrolysis burners from the preform surface is changed.

By means of each one of these measures, or by means of a combination of the measures, a temperature increase of the preform surface in the turnaround point zone can be fully or partially compensated. The temperature increase in the turnaround zone thus does not exceed the base value defined above, or does so only slightly. This has the result that both in terms of time and space the preform is heated as evenly as possible over its entire length. In this way axial density gradients in the preform are largely avoided.

Change of the listed parameters in the turnaround zone can take place in a regulated or controlled manner. The magnitude of the required change depends on numerous given factors, for example on the actual parameter values, the base value of the preform surface temperature, or on the acceptable axial density gradient of the preform. However, changes of the parameters in a concrete example can be easily optimized by an expert following a few experiments based on the teaching provided here.

Increase of the peripheral velocity refers to the average translational velocity as defined above. Due to the increase of the peripheral velocity each burner in the turnaround zone covers a larger area of the forming preform per time unit. This reduces the heating output per surface unit and thus the temperature increase in the turnaround zone.

Reduction of the burner flame temperature refers to the flame temperature set in the center of the area between the turnaround points.

Distance of the burners from the preform surface can be increased or reduced. A reduction or increase of the distance can result in lowering of the surface temperature if the burner flame at impingement point becomes colder as a result. This can be the case particularly with so-called focusing burners. The distance is measured between the burner orifice and the preform surface.

The zone around the turnaround points where these additional measures are useful starts at a few millimeters around each turnaround point. However, the zone can also extend beyond the center of adjoining turnaround points as will be explained below in more detail by way of an example where the parameter in the transitional zone is being changed continually.

An axial variation of the burner row turnaround points can also be dispensed with in this process. Therefore the apparatus-related expenditures in comparison to the process known from prior art are low despite the required regulating or control devices. However, a variation of the burner turnaround points is possible as a supplementary measure.

In a preferred implementation of the method a reduction of the flame temperature is achieved by reducing the rate of fuel gas supply to the burners in relation to the other gases supplied to the burners. Fuel gases are those gases whose exothermal reaction with one another substantially feeds the burner flame. In an oxyhydrogen gas burner these fuel gases are for example oxygen and hydrogen, which will subsequently be assumed for the sake of simplicity. A reduction of the flame temperature is achieved by either reducing the rate of oxygen and/or hydrogen supply to the burners or by supplying, or increasing the rate of, supply of other gases, such as for example of inert gases or of the starting material for the formation of the $SiO_2$ particles.

It has been shown to be particularly valuable in this context to make the following changes gradually: increase of the peripheral velocity of the growing preform, reduction of the burner flame temperature and/or change of the burner distance from the preform surface at the transitional areas ending within, before, or at the turnaround points. The gradual change leads to homogenous change between the preform areas in the turnaround point zones and the other areas of the preform. The parameter requiring change is adjusted to the desired value within the transitional areas. The adjustment of the value can terminate exactly at the turnaround point or before. The transitional zones each extend to both sides of the turnaround points. When the burner row moves away from the turnaround points the previously modified parameters are gradually returned to their original values. The transitional areas generally commence at least 10 mm before each turnaround point since in the case of smaller transitional areas the effect of a gradual parameter change is hardly noticeable.

When moving away from the turnaround points, the burner rows traverse preform areas which still exhibit a high surface temperature as a result of the opposite motion. It has been shown to be therefore advantageous to set a shorter transitional area for the burner row motion toward the turnaround points than for the reverse motion. Due to the longer transitional area each parameter is returned to the original value at a slower rate. In this manner an excessive heating of the still-hot preform surface is avoided as much as possible.

Advantageously, the preform surface temperature is measured in the flame impingement area of a burner and the measured value is used to establish the rotational velocity of the carrier, the flame temperature of the burners and/or the distance of the burners from the preform surface. This measure helps to avoid an excessive temperature increase at the turnaround points and makes maintenance of a constant preform density over the entire duration of the deposition possible.

An alternative process has also been shown to be advantageous, where the rotational velocity of the carrier, the flame temperature of the burners and/or their distance from the preform surface is controlled. The control is adjusted such that during every motion cycle one or more parameters in the turnaround point area are changed equally. A control is especially preferred when regulation is not useful or is only possible at high regulating technology expenditure.

A combined approach has been shown to be particularly advantageous, wherein on one hand the base value of the surface temperature of the growing preform is kept between 1,050 and 1,350° C., the average peripheral velocity of the preform is kept between 8 m/min and 15 m/min and the average translational velocity of the burner row is kept between 300 mm/min and 800 mm/min, and where additionally, on the other hand, in the turnaround point area the peripheral velocity of the growing form is increased and/or the flame temperature of the burners is lowered and/or their distance from the preform surface is changed. The advantageous embodiments of the individual approaches according to the invention described above in more detail have also been shown valuable for such combined approach.

Both the maintenance of the surface temperature and the above listed velocities, as well as the change of the above-named parameters in the turnaround point areas, are geared toward a warming of the preform that is as even as possible in relation to time and location and they help to keep the difference between the base value of the surface temperature and the temperature at the turnaround points as small as possible. A combination of the measures can therefore keep this temperature differential particularly small.

BRIEF DESCRIPTION OF THE DRAWINGS

Examples of the process according to the invention are shown in the drawings and are described below in more detail. In particular, there are shown schematically, in FIG. 1, a motion cycle with a constant translational velocity of the burner block and a constant peripheral velocity of the preform, by way of velocity profiles, in FIG. 2, a motion cycle with an increased peripheral velocity of the preform in the turnaround point area, by way of velocity profiles, in FIG. 3, a motion cycle where the flame temperature is being varied in a transitional area, by means of a temperature profile, in FIG. 4, a motion cycle where the flame temperature is being varied in a transitional area, by means of a further temperature profile, in FIG. 5, a motion cycle where in a transitional area the distance between the burner orifice and the preform surface is being changed, by way of a distance profile, and in FIG. 6, a device for the implementation of the process according to the invention, in a side view.

DETAILED DESCRIPTION

Figure 6:
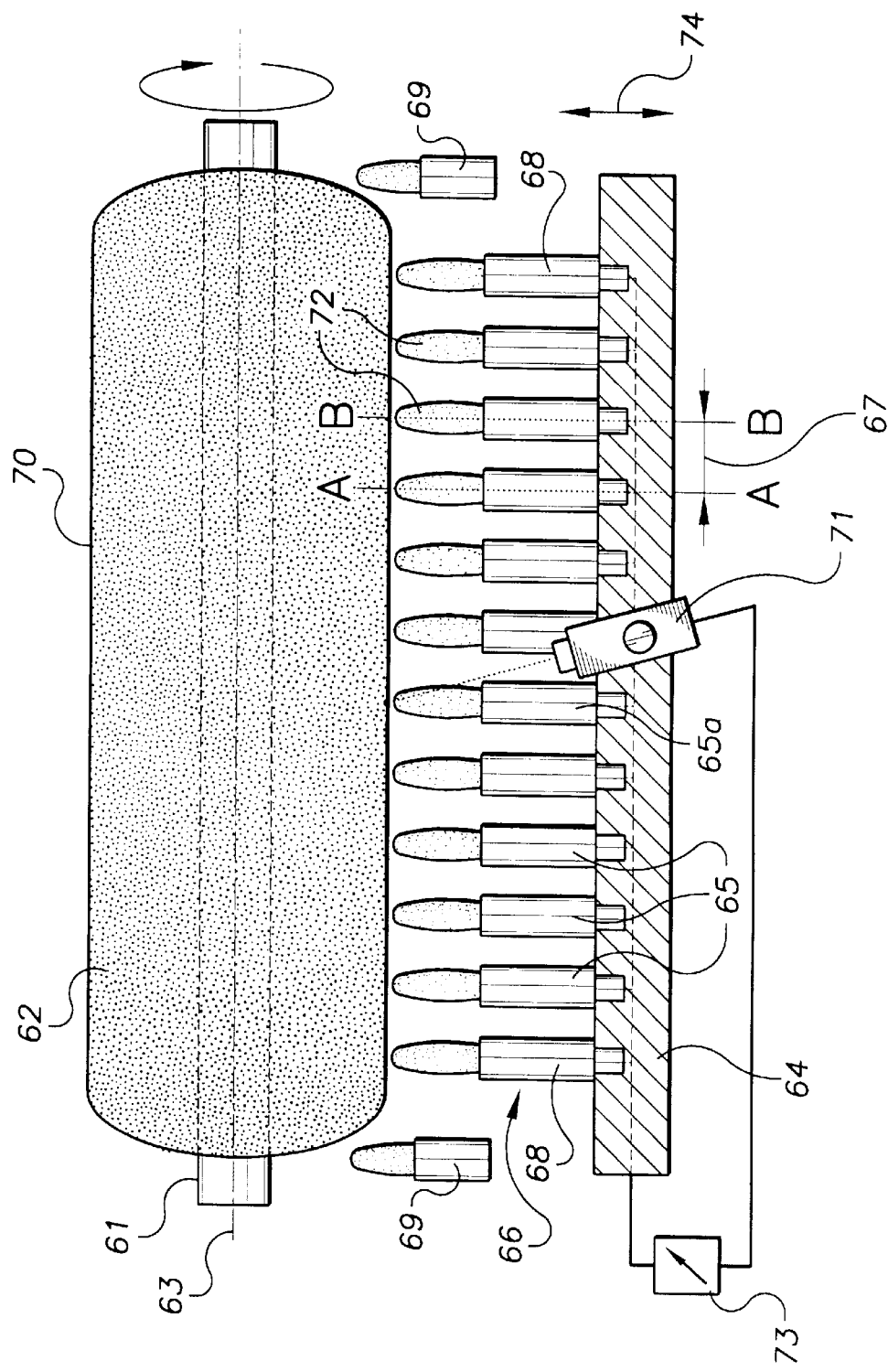

A device for the implementation of the process according to the invention is shown schematically in FIG. 6 as it was used in the examples described in more detail below. A porous preform 62 is deposited from $SiO_2$ particles on an aluminum oxide carrier 61 which is rotating about its longitudinal axis 63. The deposition of the $SiO_2$ particles takes place by means of flame hydrolysis burners 65 of quartz glass, which are arranged in a row 66 on a burner block 64 which extends parallel to the longitudinal axis 63 of the carrier 62. The burner block 64 moves forward and back along the longitudinal axis 63 of the carrier 61, between two turnaround points which are fixed in relation to the longitudinal axis 63. The amplitude of the forward and back motion is characterized by the directional arrow 67. It measures 15 cm and corresponds to the axial distance between the turnaround points or between the burners 65, as seen in the direction of the longitudinal axis 63.

The row 66 of the burners 65 for the deposition is closed up on each side by additional burners 68. The additional burners 68 are also installed on the burner block 64 and their distance from the next closest hydrolysis burner 65 is in each instance equal to the above burner distance. The flame temperature of the additional burners 68 is set to approximately the same value as those of the hydrolysis burners 65. The additional burners 68 provide a similar temperature profile in the end zones of the burner row 66 as exists in its central zone. The hydrolysis burners 65 are each supplied with oxygen and hydrogen as fuel gases and with $SiCl_4$ as the starting material for the formation of $SiO_2$ particles. The two additional burners 68 are supplied with fuel gases only.

Additional heating burners 69 are provided at the frontal sides of the preform 62 and are fixedly installed in relation to the preform 62. The heating burners 69 generate a higher temperature in the margin areas of the preform as compared to the hydrolysis burners 65 or the additional burners 68. This results in increased density of both ends of the preform 62 and thus in higher mechanical stability.

The temperature of the preform surface 70 is being monitored constantly. A pyrometer is aimed at the preform surface 70 for this purpose such that its measuring target is located in the impingement point of flame 72 of one of the central hydrolysis burners 65a. The pyrometer 71 is fixed to the burner block 64 and moves with it forward and back. The pyrometer is an "Infratherm IN 4/5" model made by IMPAC and has a measurement wavelength of 5.14 µm. The measurement area is approximately 5 mm and the distance of the pyrometer from the preform surface is 30 cm. The burner flame impingement point has a diameter of about 15 mm. The measurements derived in this manner are used to determine the base value of the surface temperature as the lowest temperature in a motion cycle, i.e., a forward and back movement of the burner block 64.

The pyrometer 71 is connected with a control device 73 which regulates the fuel gas supply to the hydrolysis burners 65.

The distance between the surface 70 of the preform 62 and the burner block 64 is held constant during the deposition process. For this, the burner block 64 is movable perpendicular to the longitudinal axis 63 of the carrier 61, as indicated by directional arrow 74.

Diagrams in FIGS. 1 to 4 show the profiles of parameters as they are being changed during a motion cycle between two adjoining turnaround points A and B. Each y-axis indicates the distance of the burner block motion between the turnaround points A and B, while the various parameters of the $SiO_2$ deposition are recorded on the x-axis.

The parameter profile curves are provided with directional arrows which indicate the applicable direction of the burner block motion for each curve section. For a clearer depiction the curves in the diagrams are drawn next to each other (and not over one another) even when the parameter values are the same.

EXAMPLE 1

Figure 1:
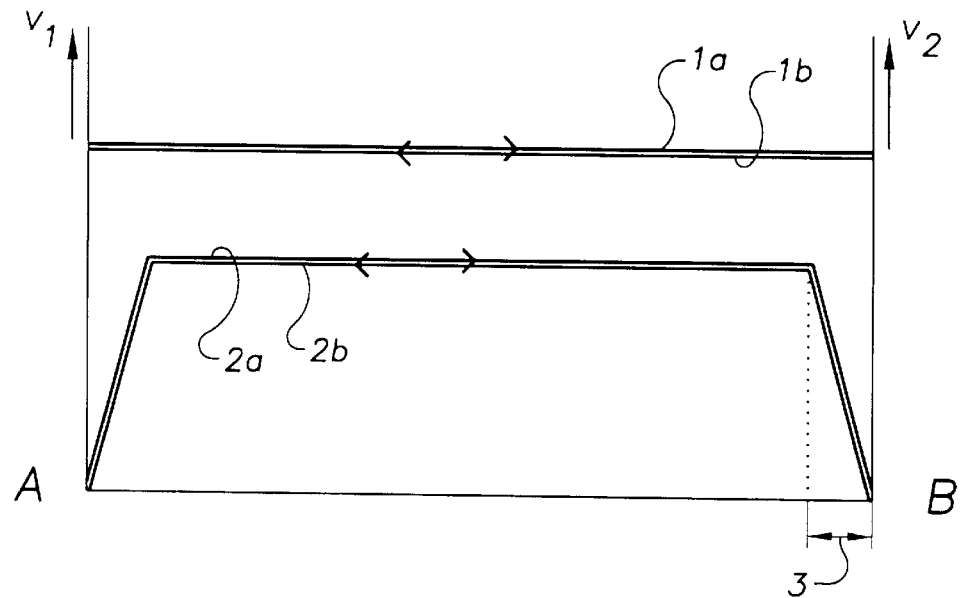

On the y-axis in FIG. 1, the peripheral velocity of the preform is plotted as $v_1$ and the translational velocity of the burner block is $v_2$.

The peripheral velocity $v_1$ is set at a constant 12 m/min during the entire motion cycle and during the entire deposition process. In the diagram, the portion of the curve showing the forward motion of the burner block toward the turnaround point B is represented by 1a, and the reverse motion of the burner block from the turnaround point B to the turnaround point A is marked 1b.

The average translational velocity of the burner block is 500 mm/min (curves 2a and 2b). Apart from the slowing or accelerating distances 3 in the area of the turnaround points A and B which are insignificant as far as concerns the average translational velocity, $v_2$ is also kept constant, both during the entire motion cycle and during the entire deposition process (in terms of the rate). The lengths of the slowing or accelerating distances 3 are in the range of a few millimeters.

The velocity profile shown in FIG. 1 is maintained during the entire deposition process. During the deposition a surface temperature basis value of about 1,250° C., is measured on the preform surface. It should be noted that as the outer diameter of the preform increases, the surface cools off faster due to increased heat radiation. In order to maintain the basis value of the surface temperature at a constant 1,250° C, measures are necessary to counteract the faster cooling off. For this purpose the flame temperature of the hydrolysis burners is being continually increased in this example.

The preform peripheral velocity $v_1$ as well as the burner block average translational velocity $v_2$ are relatively small. Therefore the rate of the relative motion between the hydrolysis burners and the burner block is also small and a good heating of the preform in the burner flame impingement area is achieved.

The temperature increase due to the doubled heating of the preform surface by the forward and back motion in the turnaround point areas A and B therefore only amounts to 50° C. This assures a relatively flat surface temperature gradient between the turnaround points A, B and thus a small density gradient of the preform in this area.

EXAMPLE 2

Figure 2:
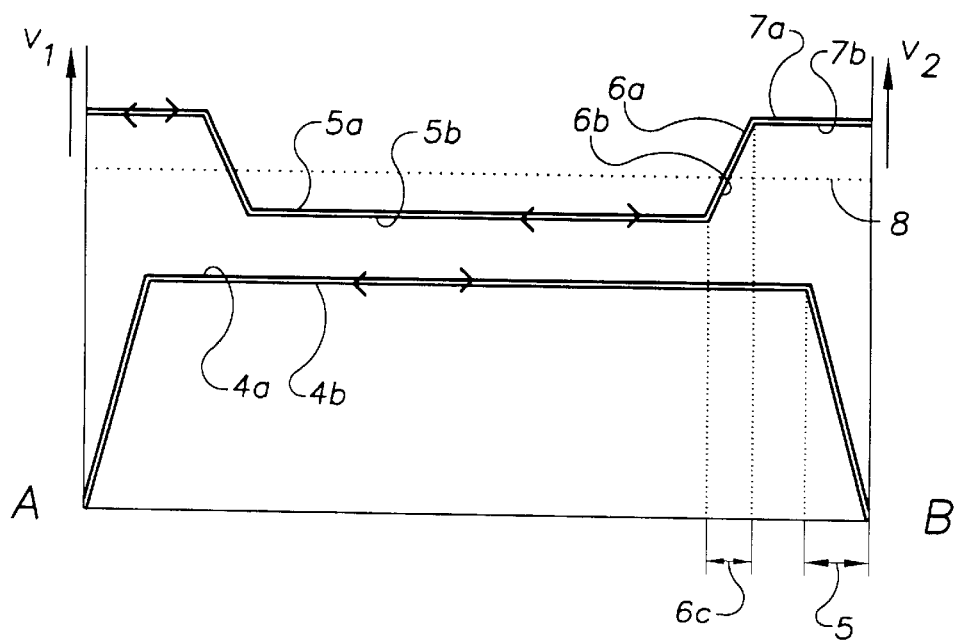

In FIG. 2. as well, the peripheral velocity of the preform is plotted on the y-axis as $v_1$ and the translational velocity of the burner block as $v_2$.

The average translational velocity of the burner block is 800 mm/min (curve 4a and 4b). Apart from the braking or accelerating distances 5 in the area of the turnaround points A and B which are insignificant as far as concerns the average translational velocity, the translational velocity is kept constant, both during the entire motion cycle and during the entire deposition process (in terms of the rate). The lengths of the braking or accelerating distances 5 are in the range of a few millimeters.

The preform peripheral velocity $v_1$ is controlled by a fixed program. It is adjusted over a distance of about 9 cm between the turnaround points A and B at 12 m/min (curve sections 5a and 5b). During a forward motion of the burner block, for example toward the turnaround point B and from about 3 cm before it, the peripheral velocity $v_1$ is gradually increased within about a 5 mm long transitional area 6c to 18 m/min (curve section 6a). $v_1$ is then kept at this higher value until the turnaround point B (curve section 7a). During the reverse motion of the burner block from the turnaround point B, this same velocity profile is reversed (curve sections 7b, 6b, 5b). The same velocity profile is run correspondingly during the forward motion of the burner block toward the turnaround point A. The average peripheral velocity in the motion cycle is about 14 m/min. This velocity is schematically indicated in FIG. 2 by a dotted line 8.

The velocity profile represented in FIG. 2 is maintained during the entire deposition process. The measured base value of the preform surface temperature is 1,280° C. during the deposition process. As far as the maintenance of this surface temperature is concerned while the outer diameter of the preform increases, the information provided above in respect to FIG. 1 applies here. A constant surface temperature is necessary if a radial density gradient in the preform is to be avoided.

The average peripheral velocity of the preform and the average translational velocity of the burner block are relatively small. Therefore the rate of the relative motion between the hydrolysis burners and the burner block is also small and a good heating of the preform in the burner flame impingement area is achieved. In addition, in the area of the turnaround points A and B, the preform receives less heating per surface unit due to the higher peripheral velocity so that the temperature increase caused by the doubled heating of the preform surface during the forward and back motion in the turnaround point areas A and B can be kept very small. It only amounts to 40° C.

EXAMPLE 3

The preform peripheral velocity $v_1$ and the burner block translational velocity $v_2$ are regulated according to the example explained by FIG. 1. A constant surface temperature base value of 1,250° C. is maintained at the preform surface during the deposition process. In addition, in this example the flame temperature of the hydrolysis burners is being varied in the turnaround point area of the burner block motion.

Figure 3:
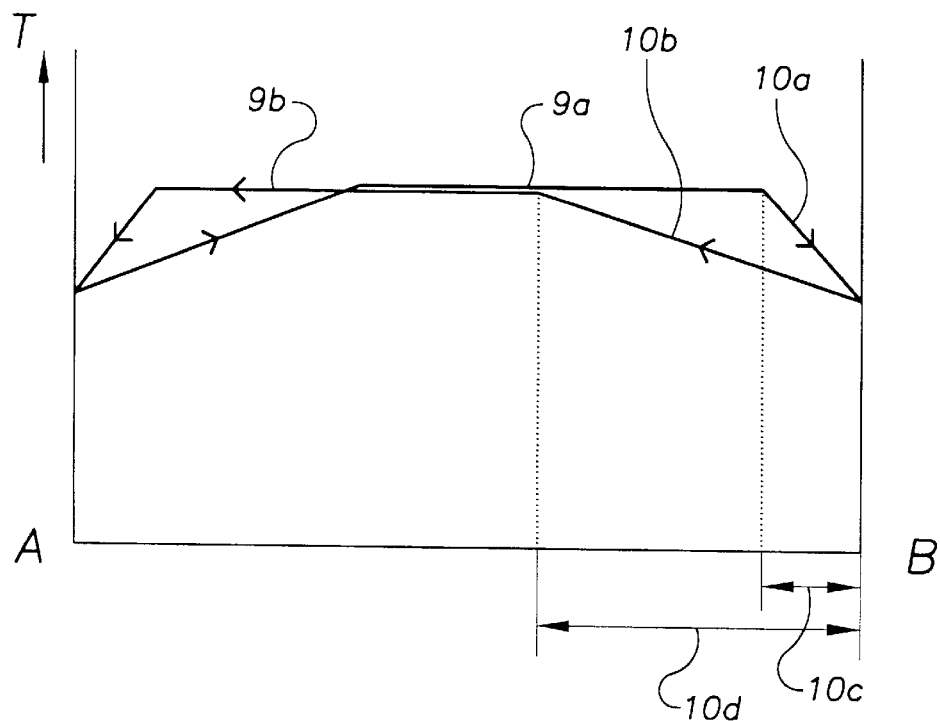

The variation of the flame temperature is controlled by a program and is explained by means of FIG. 3. The flame temperature "T" of the hydrolysis burners is plotted in relative units on the y-axis.

In a central area between the turnaround points A, B (curve sections 9a, 9b) the flame temperature is kept at a high level. During the forward motion of the burner block, for example in the direction toward the turnaround point B and approximately 3 cm before it, the flame temperature is continually lowered in a transitional area 10c (curve section 10a). The transitional area 10c ends at the turnaround point B.

In a first process variant the flame temperature is lowered by a continual reduction of the fuel gas supply, by a total of 8% of the initial amount as was set immediately preceding the transitional area 10c. At the same time the ratio of oxygen and hydrogen is kept constant. The supply of the remaining gases to the hydrolysis burners is also left unchanged.

In a second process variant the flame temperature is lowered by supplying nitrogen to the burners. For this the flow of nitrogen is continually increased in the traditional area 10c until it reaches about 20% of the hydrogen supply.

In a third process variant the flame temperature is lowered by additional supply of SiCl$_4$ to the burners while the fuel gas supply is kept constant. For this the flow of SiCl$_4$ is being continually increased up to about 20% of the initial amount as it was set immediately preceding the transitional area 10c.

When the burner block is traveling back from the turnaround point B the flame temperature is again gradually increased in a further transitional area 10d until it reached the original value (curve section 10b); however, the temperature increase is somewhat slower than the temperature decrease in the curve section 10a. The reason for this is that during the reverse travel the surface temperature of the preform is still raised in the area adjoining the turnaround point due to the heating that took place in the course of the forward motion. In order to avoid an additional heating of this area by a rapid flame temperature increase, the temperature is increased slower to its original value than in the transitional area 10c, until it reaches the original temperature in curve section 9b. High temperature differences and thus density variations are avoided by means of these transitional areas 10c, 10d with their varying lengths.

The same purpose is achieved by a process variant where the flame temperate during the reverse travel from the turnaround point B is at first being kept constantly low during a certain distance and is increased only later, as will be explained by way of a similar process in example 5.

In all process variants the increase of the flame temperature takes place by restoring the original gas supply rates to the hydrolysis burners.

The preform is subject to lower heat output in the area of the turnaround points A, B due to the lowering of the flame temperature, so that the temperature increase caused by the double heating of the preform surface as a result of the forward and back motion in the area of the turnaround points A, B only amounts to 35° C.

In a further process variant the flame temperature of the hydrolysis burners can be set by means of a control device. The reference surface temperature for the purposes of control is set at 1,250° C. The preform surface temperature is continually measured at the flame impingement point by means of a pyrometer. In case of a temperature change, for example in case of a temperature increase in the turnaround point area, the flame temperature of all hydrolysis burners is adjusted by the control device through a change of one or more gas flows supplied to the hydrolysis burners. The above indicated process variants are suitable for a change of the flame temperature. The control device in particular contributes to an avoidance of an unacceptable temperature increase at the turnaround points and makes possible the maintenance of a constant preform density over the entire duration of the deposition. In this way the temperature increase in the turnaround point areas can be limited to less than 30° C.

EXAMPLE 4

Figure 4:
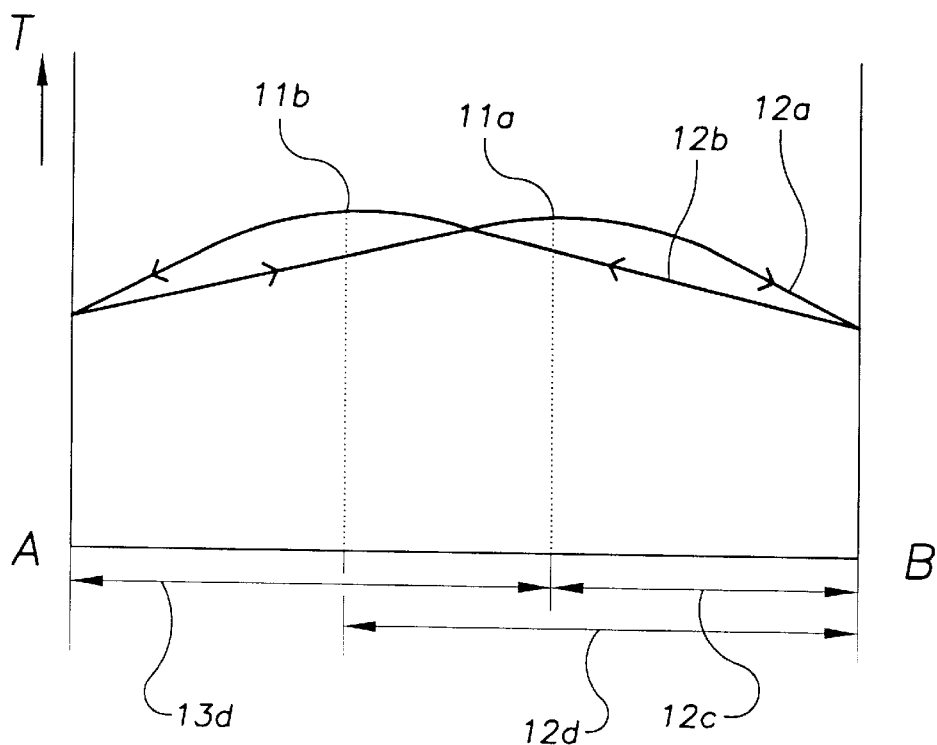

The deposition parameters illustrated by the example in FIG. 4 are set according to the process variant described by way of FIG. 3. However, in contrast to the temperature profile "T" represented in FIG. 3, the flame temperature is being constantly varied by programmed control during the motion cycle. Therefore the areas of constant flame temperature (curve sections 9a and 9b in FIG. 3) are absent in this temperature profile.

During the forward motion of the burner block toward the turnaround point B the burner flame reaches its maximal temperature at a point 11a, approximately 6 cm before the turnaround point B. Afterward the flame temperature is continually reduced in a transitional area 12c (curve section 12a) and reaches its minimum temperature at the turnaround point B. Thus the transitional area 12c ends there. The lowering of the flame temperature takes place according to the process variants described above by way of FIG. 3.

During the reverse travel of the burner block the flame temperature is again gradually returned to its maximal temperature in a further transitional area 12d, reaching the maximum at point 11b of the temperature profile (curve section 12b). The transitional area 12d ends approximately 6 cm before the turnaround point A; it extends thus about 9 cm from the turnaround point B. An overheating of the preform in its region adjoining turnaround point B is thus prevented by the slower temperature increase in the transitional area 12d during the reverse travel as was already explained in more detail be way of FIG. 3. In this example, the transitional areas 12d, 13d overlap during the reverse travel from the turnaround points A and/or B.

In this process variant, irregularities of the flame temperature are avoided. In addition to the measures already explained by way of FIG. 1, the flame temperature is lowered in the area of the turnaround points A, B. In this way the preform is subjected to a lesser heat output, so that the temperature increase due to the double heating of the preform surface caused by the forward and back motion in the area of the turnaround points A, B merely amounts to 35° C.

EXAMPLE 5

In this example the peripheral velocity of the preform and the translational velocity of the burner block are set according to the example explained by way of FIG. 1. During the deposition process a constant surface temperature base value of 1,250° C. is measured at the preform surface.

Figure 5:
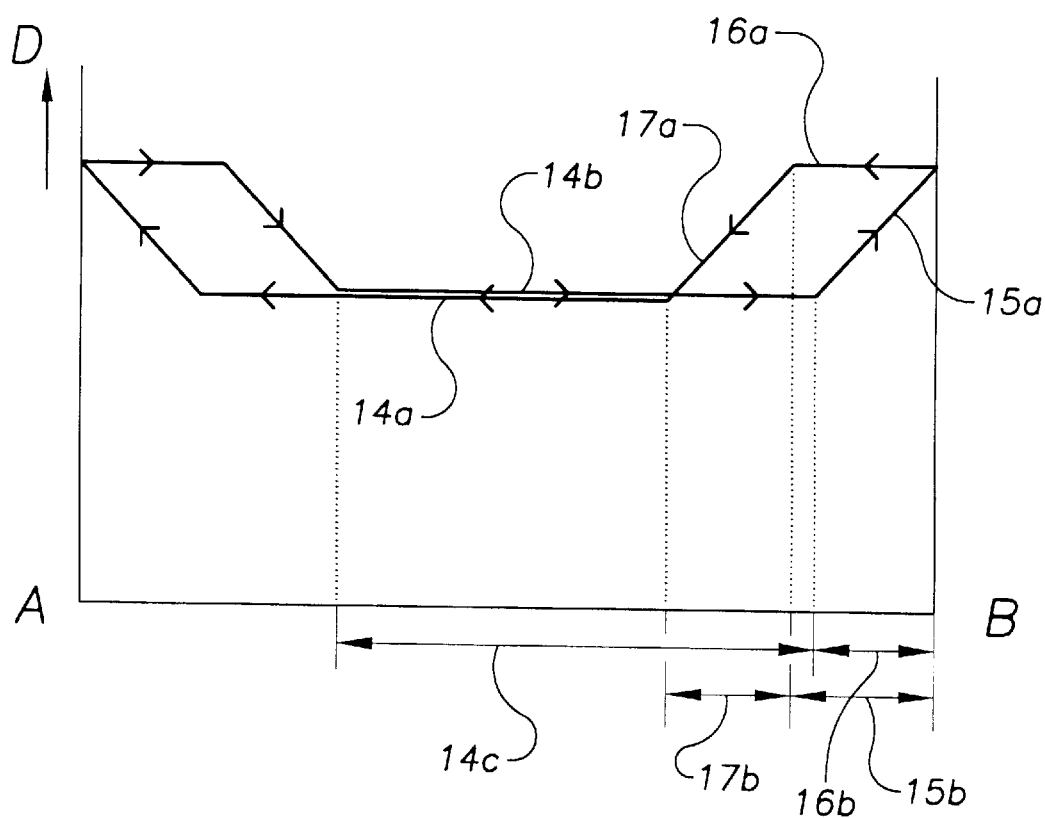

In this example the low temperature increase in the area of the turnaround points is the result of a change in the distance of the burner orifices from the preform surface. This distance "D" is plotted on the y-axis of the motion cycle represented in FIG. 5. When the motion cycle is viewed during the movement of the burner block in the direction toward the turnaround point B, it is apparent that between the turnaround points A, B the distance is kept steadily small over an interval 14c from about 9 cm to about 15 cm (curve section 14a), and is subsequently gradually increased in a transitional area 15b at a constant rate of change of 7.5 mm/s (curve section 15a). The transitional area 15b ends at the turnaround point B; there the distance between the hydrolysis burner orifice and the preform is about 10% greater than in the curve section 14a; it amounts therefore to about 16.5 cm.

During the reverse travel of the burner block the distance is kept at a higher value over an interval 16b of about 2.5 cm (curve section 16a) and is subsequently gradually reduced to the original distance of 15 cm at a rate of change of 7.5 mm/s in a transitional area 17b (curve section 17a). In the course of further travel of the burner block toward the turnaround point A this distance is again kept constant over an interval of about 9 cm (curve section 14b) and the same distance profile is subsequently executed as was explained above in reference to turnaround point B.

The delayed adjustment to the smaller distance during the reverse travel from the turnaround points A, B (curve section 16a) causes a slower heating of the preform surface which is still heated up as a result of the forward motion and thus prevents an overheating of the preform surface in the areas around the turnaround points A, B.

Increase of the distance between the hydrolysis burners and the preform surface in the turnaround point area additionally contributes to as even a heating as possible of the preform over its length. A temperature increase of merely 35° C. was measured in the area of the turnaround points A, B.

We claim:

1. A process for the production of quartz glass bodies by deposition of $SiO_2$ particles on the mantle surface of a cylindrical carrier rotating about its longitudinal axis and forming an elongated porous preform, said process comprising:

forming the $SiO_2$ particles in a plurality of hydrolysis burners which are arranged in at least one burner row disposed parallel to the longitudinal axis of the carrier;

providing for relative reciprocating movement of the burner row relative to the preform parallel to the longitudinal axis of the carrier so that each burner reciprocates between respective turnaround points located between longitudinal ends of the preform at which turnaround points the direction of reciprocating movement is reversed, where the burners move at preset transitional speed forward and back between respective transitional areas adjacent the turnaround points in which transitional areas the burners move slower that said preset transitional speed; and sintering of the preform thus produced;

wherein, when the burners are in the transitional area adjacent the turnaround points, the peripheral velocity of the forming preform is increased, the flame temperature of the hydrolysis burners is lowered, or the distance of the hydrolysis burners from the preform surface is changed.

2. A process according to claim 1, wherein the turnaround points are kept at a distance in a range between 5 cm and 40 cm.

3. A process according to claim 1 and further comprising a warming burner positioned bewteen two adjoining hydrolysis burners in the burner row.

4. The process according to claim 1, wherein the hydrolysis burners are supplied with fuel gases and an inert gas at a controllable rate, the flame temperature being lowered by increasing the rate of inert gas supply.

5. A process according to claim 1 wherein the hydrolysis burners are supplied with fuel gases and other gases flowing at controllable rates, and wherein the flame temperature is lowered by reducing the rate of flow of the fuel gases in relation to the rate of flow of the other gases being supplied to the hydrolysis burners.

6. A process according to claim 1 wherein the flame temperature is lowered by supplying inert gas to the hydrolysis burners.

7. A process according to claim 1 wherein the hydrolysis burners are supplied with starting material at a supply rate, and oxygen and/or hydrogen, the flame temperature being reduced by increasing the rate of supply of the starting material to the hydrolysis burners for the formation of $SiO_2$ particles relative to the supply of oxygen and/or hydrogen.

8. A process according to claim 1 wherein the increase of the peripheral velocity of the preform, the decrease of the flame temperature of the hydrolysis burners or the change of the distance of the hydrolysis burners from the preform surface within the transitional areas ending before or at the turnaround points takes place gradually.

9. A process according to claim 8, wherein each of the transitional areas during the forward motion of the burner row toward the turnaround points is shorter than the transitional area during the reverse motion away from the turnaround points.

10. A process according to claim 1 wherein the preform surface temperature is measured in a flame impingement area of one of the hydrolysis burners and the resulting measurement value is used for regulating the rotational velocity of the carrier, the flame temperature of the hydrolysis burners and/or the distance of the hydrolysis burners from the preform surface.

11. The process according to claim 1 wherein the relative reciprocating movement is provided by the burner now remaining substantially stationary and the preform moving reciprocally along a longitudinal path.

12. The process according to claim 1 wherein the relative reciprocating movement is provided by the preform remaining substantially stationary and the burner row moving reciprocally along a longitudinal path.

13. A process for the production of quartz glass bodies by deposition of $SiO_2$ particles on the mantle surface of a cylindrical carrier rotating about its longitudinal axis and forming an elongated porous preform, said process comprising;

forming the $SiO_2$ particles in a plurality of hydrolysis burners which are arranged in at least one burner row disposed parallel to the longitudinal axis of the carrier;

providing for relative reciprocating movement of the burner row relative to the preform parallel to the longitudinal axis of the carrier so that each burner reciprocates between respective turnaround points located between longitudinal ends of the preform at which turnaround points the direction of reciprocating movement is reversed, where the burners move at preset transitional speed forward and back between respective transitional areas adjacent the turnaround points in which transitional areas the burners move slower than said preset transitional speed; and wherein the distance between turnaround points is substantially equal to the distance between burners in the burner row; and sintering of the preform thus produced;

wherein, when the burners are in the transitional areas adjacent the turnaround points, the peripheral velocity of the forming preform is increased, the flame temperature of the hydrolysis burners is lowered, or the distance of the hydrolysis burners from the preform surface is changed.

* * * * *

UNITED STATES PATENT AND TRADEMARK OFFICE
CERTIFICATE OF CORRECTION

PATENT NO. : 6,047,564
DATED : April 11, 2000
INVENTOR(S) : Schaper et al.

It is certified that error appears in the above-identified patent and that said Letters Patent is hereby corrected as shown below:

Claim 1, line 54, change "preset" to -- a preset --.

line 57, change "that" to -- than --.

Claim 11, line 2, change "now" to -- row --.

Signed and Sealed this

Twentieth Day of March, 2001

Attest:

NICHOLAS P. GODICI

Attesting Officer

Acting Director of the United States Patent and Trademark Office